Oct. 27, 1970 T. R. BISHOP 3,536,378
SYSTEM FOR PRODUCING OPTICAL ILLUSION OF
THREE-DIMENSIONAL LIGHT BEAM
Filed April 1, 1965 5 Sheets-Sheet 1

INVENTOR
*Troy R. Bishop*

By *Lane, Aitken, Dunner & Ziems*
Attorneys

Oct. 27, 1970 — T. R. BISHOP — 3,536,378
SYSTEM FOR PRODUCING OPTICAL ILLUSION OF
THREE-DIMENSIONAL LIGHT BEAM
Filed April 1, 1965 — 5 Sheets-Sheet 2

INVENTOR
Troy R. Bishop

By Lane, Aitken, Dunner & Ziems
Attorneys

Oct. 27, 1970  T. R. BISHOP  3,536,378
SYSTEM FOR PRODUCING OPTICAL ILLUSION OF
THREE-DIMENSIONAL LIGHT BEAM
Filed April 1, 1965  5 Sheets-Sheet 3

INVENTOR
Troy R. Bishop

By
Lane, Aitken, Dunner, & Ziems
Attorneys

Oct. 27, 1970 T. R. BISHOP 3,536,378
SYSTEM FOR PRODUCING OPTICAL ILLUSION OF
THREE-DIMENSIONAL LIGHT BEAM
Filed April 1, 1965 5 Sheets-Sheet 4

INVENTOR
Troy R. Bishop

By
Lane, Aitken, Dunner & Ziems
Attorneys

Oct. 27, 1970     T. R. BISHOP     3,536,378
SYSTEM FOR PRODUCING OPTICAL ILLUSION OF
THREE-DIMENSIONAL LIGHT BEAM
Filed April 1, 1965     5 Sheets-Sheet 5

INVENTOR
Troy R. Bishop

United States Patent Office 3,536,378
Patented Oct. 27, 1970

3,536,378
SYSTEM FOR PRODUCING OPTICAL ILLUSION OF THREE-DIMENSIONAL LIGHT BEAM
Troy R. Bishop, 13516 Grenoble Drive, Rockville, Md. 20853
Filed Apr. 1, 1965, Ser. No. 444,540
Int. Cl. G02b 27/22
U.S. Cl. 350—167                            8 Claims

ABSTRACT OF THE DISCLOSURE

Devices for producing the optical illusion of a three-dimensional beam extending into space are disclosed. Each device comprises an optical element on which tiny arcuate ridges and grooves are formed in a manner to scatter incident rays of light into planes perpendicular to the arcuate grooves. The result is that the optical element magnifies the light source on the element into a line of light the position of which varies with the position of the eye of the observer. In one embodiment the element is made transparent to superimpose the visual representation produced on the element in the environment of the observer so that the observer sees a three dimensional beam applied extending into space. Another embodiment of the optical element in a reflecting element and a separate combined transmitting and reflecting element is used to superimpose the visual representation produced on the optical element in the environment of the observer.

---

This invention relates to optical methods and systems and more particularly to an optical device which scatters or diffuses incident light rays only in predetermined planes and to methods and apparatus making use of such optical devices.

The optical device of the present invention may either be a transmission element, which affects light transmitted through the element, or a reflection element which affects light that it reflects. The transmission element comprises a sheet of transparent material with one of its surfaces formed into tiny, closely-spaced ridges and grooves running generally parallel to one another. The ridged surface will diffuse or scatter light primarily in predetermined planes. Because of this characeristic, the transparent sheet will magnify a light source into a line perpendicular to the direction of the ridges.

The reflection element of the present invention operates on the same principle as the transmission element. The reflection element comprises a sheet of reflecting material, the reflecting surface of which is formed in tiny, closely-spaced ridges and grooves extending generally parallel to one another. The reflection element diffuses or scatters light primarily in predetermined planes. As a result, the reflection of a point source of light from the reflector will be a line of light.

In accordance with the method of the present invention, the transmission element is used as a special type of filter to eliminate from a visual representation, such as a map, photograph or printed page, all lines which do not extend parallel to a given coordinate axis and to magnify points aligned with the given coordinate axis into lines. This filtering is accomplished by observing the visual representation through the transmission element with the transmission element oriented so that the ridges extend perpendicular to the selected coordinate axis along which it is desired to transmit lines and magnify aligned points into lines. The transmission element will then filter out lines which do not extend parallel to the selected coordinate axis. The only lines in the visual representation which will be visible through the transmission element will be those which extend parallel to the selected coordinate axis. Any closely-spaced dots which are aligned with the selected coordinate axis will also appear as a line.

It will be apparent that this filtering method will be invaluable in the analysis of aerial photographs to find roads, railroad tracks and other features which are linear in shape. Moreover, the method can be used in conjunction with a photocell to automatically orient a printed page. In a printed page, the majority of the lines are vertical. If a printed page were rotated relative to the transmission element until a photocell detected that a maximum number of vertical lines were passing through the transmission element, the printed page would then be vertically oriented. This operation would be useful in the new data processing equipment which reads printed material.

Because the transmission element magnifies aligned points into lines, the transmission element is also in correlating, interpolating or extrapolating data points.

The reflection element can also be used to perform the same filtering and magnification effects that the transmission element performs. To use the reflection element in this manner, the rigid surface of the reflection element is positioned to reflect the visual representation with the ridges extending in a direction perpendicular to the co-ordinate axis along which it is desired to transmit lines and magnify dots into lines.

Accordingly, an object of the present invention is to provide a method which will filter out all lines other than lines extending parallel to a predetermined coordinate axis.

Another object of the present invention is to facilitate the finding of alignment along a predetermined coordinate axis in a visual representation such as a map or photograph.

A further object of the present invention is to provide a method of filtering which will magnify closely-spaced dots along a predetermined coordinate axis into lines and eliminate all line perpendicular to the predetermined coordinate axis.

A still further object of the invention is to facilitate the correlation, interpolation and extrapolation of data points.

In addition, the transmission element and reflection element, because of their property of magnifying a point into a line, can be used to find tangents to curves. Accordingly, another object of the present invention is to provide an improved method of finding tangents to curves.

In accordance with another form of the invention, the transmission element or reflection element as described above is used to produce the optical illusion of a beam or ray extending in three dimensions out into space. In this form of the invention, the parallel-extending ridges are curved and preferably are concentric circles or arcs. A light source is provided and produces a line image on the transparent or reflecting member. Each eye will see a line image in a different angular position. As a result, the observer will have the stereoscopic illusion of seeing a three dimensional beam or ray extending out into space. In one embodiment of the invention, this effect is used as a child's toy in the form of a ray gun. When the child pulls the trigger and looks into a viewer on the toy ray gun, the child will see a very realistic illusion of a three-dimensional ray extending out into space in the direction that the gun is pointing. In addition, the optical illusion of a three-dimensional ray or beam can be used in combination with a rifle, missile launcher or other ordnance piece to provide a means for quickly aiming the ordnance piece at a desired target. Also, the effect can be used to direct a pilot along a proper landing path or to guide the operator of any mobile craft. The effect can also be used to provide an indication of distance or range.

Accordingly, another object of the present invention is to provide an apparatus which will produce an optical illusion of a beam or ray extending into space.

A further object of the present invention is to produce an optical illusion of a beam or ray extending out into space.

A still further object of the present invention is to provide a child's toy in the form of a ray gun which produces the optical illusion of a beam or ray extending out into space.

A still further object of the present invention is to facilitate the aiming of guns.

A still further object of the present invention is to facilitate the landing of aircraft and the guiding of mobile craft.

Further objects and advantages of the present invention will become readily apparent as the following detailed description of the invention unfolds and when taken in conjunction with the drawings, wherein.

Figure 1:
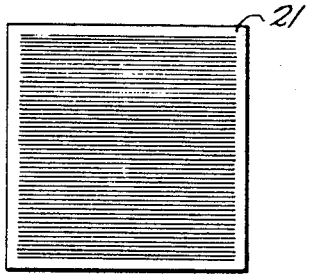
FIG. 1 illustrates the rectangular optical transmission element of the present invention.

The optical transmission element of the present invention shown in FIG. 1 comprises a flat sheet 21 of transparent material. One side of the sheet 21 has defined in its surface tiny, closely-spaced, straight ridges and grooves extending generally parallel to one another. The size of the ridges and grooves should be such as to almost make them invisible or smaller. In other words, the ridges and grooves should be no larger than barely macroscopic. Because the ridges and grooves of the transmission element shown in FIG. 1 are straight, this transmission element is referred to as a rectangular transmission element. The ridges and grooves can be formed in the surface of the transparent sheets simply by scratching the surface of the transparent sheet with sandpaper or a grinding wheel, for example. Alternatively, the ridges and grooves could be formed in a film of transparent material deposited on the surface of a transparent sheet.

Figure 2:
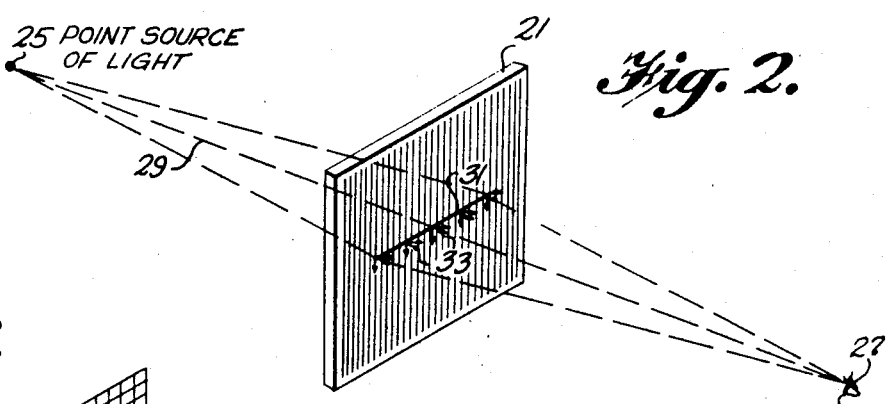
FIG. 2 illustrates how the rectangular transmission element of FIG. 1 magnifies a point source of light into a line.

The transmission element illustrated in FIG. 1 will magnify a point source of light into a line, as is illustrated in FIG. 2. In FIG. 2 the point source is designated by the reference number 25 and the eye of an observer is designated by the reference number 27. A straight line extending from the source 25 to the eye 27 passes through the sheet 21 and is represented by the dashed line 29. The member 21 will magnify the source 25 into a line so that the observer will see an illuminated line 31 on the surface of the transparent sheet 21. The reason that the observer will see a line 31 instead of the point source 25 is that the light rays from the source 25, upon passing through the member 21 and through the ridged surface of the member 21, are reflected and refracted in different directions in predetermined planes. The plane that each ray of light is refracted or reflected in is defined by the direction line of the light ray when it impinges upon the ridged surface and a line in the plane of the element perpendicular to the direction of the ridges. As a result, light will be scattered along the line 31 in a plane defined by the line 29 and the line 31, which is perpendicular to the direction in which the ridges extend, as is illustrated by the arrows 33. Because of this scattering, light will be directed toward the eye 27 from all along the length of the line 31. Because most of the scattering takes place in planes as defined above, the eye 27 will not receive a significant amount of light from any part of the transparent member 21 except along the line 31. Accordingly, the member 21 magnifies the light source 25 into the line 31.

Ideally, the grooves and ridges are formed as the development of perfect arcs to provide the desired planar scattering. However, the member 21 will work effectively even if the grooves and ridges are formed in a crude manner, such as by scratching the surface with sandpaper or a grindstone. This is probably because the sandpaper in forming the grooves and ridges forms a large number of tiny planar and curved surfaces which are all substantially parallel to lines extending in the direction of the ridges but which are randomly oriented at different angular positions with respect to such lines.

Figure 3:
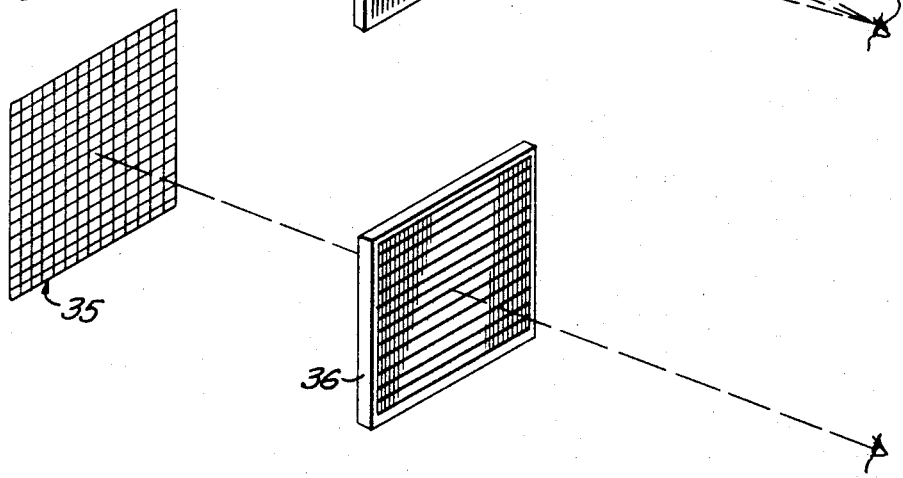
FIGS. 3 and 4 illustrate the method of the invention of filtering out all lines which do not extend parallel to a predetermined coordinate axis using the rectangular transmission element shown in FIG. 1.
Figure 4:
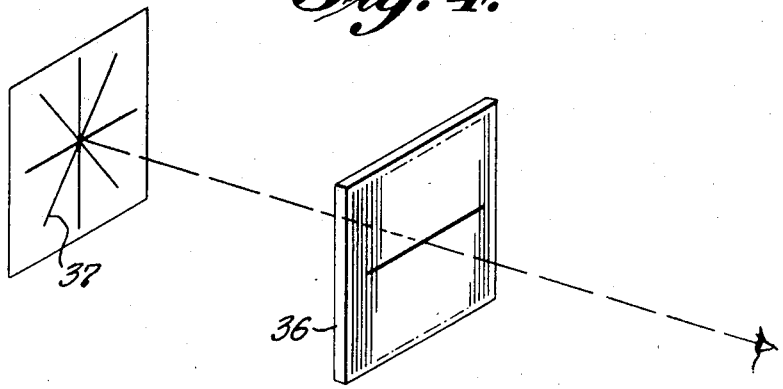

Because of the manner in which the transmision element scatters light, it can be used as a filter to filter out from a visual representation all lines which are not perpendicular to the direction of the ridges. For example, if a rectangular grid of lines 35, as shown in FIG. 3, is observed through a rectangular transmission element 36 with the lines of the grid oriented so that one set of the grid lines is perpendicular to the ridges and the other set is parallel to the ridges, then only the lines perpendicular to the ridges will be visible in the grid 35. If an asterisk pattern 37 of crossed lines extending in different directions, as shown in FIG. 4, is observed through the rectangular transmission element 36, then only that line of the pattern 37 which is perpendicular to the ridges will be visible.

Figure 5:
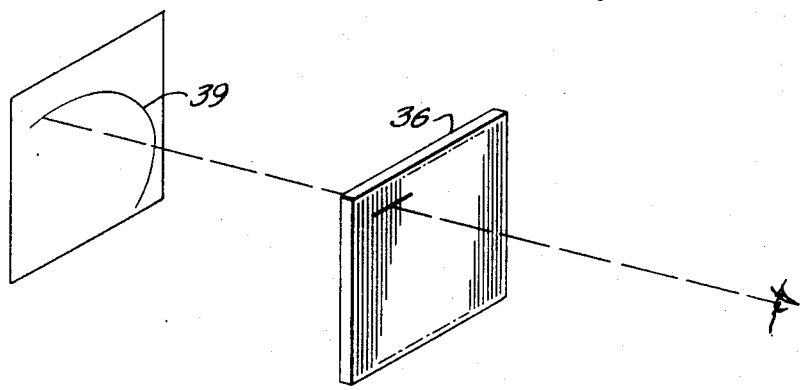
FIG. 5 illustrates the method of the invention of finding a tangent to a curve extending in a predetermined direction using the rectangular transmission element of FIG. 1.

If a curved line is observed through the transmission element 36, then a short line tangent to the curve at that point at which the curved line becomes perpendicular to the ridges of the transmission element 36 will be seen throuhg the transmission element. This effect is illustrated in FIG. 5, in which the curved line is designated by the reference number 39. Accordingly, the transmission element 36 can be used to find tangents to curves or arcs. For example, if it is desired to find the tangent to the curve 39 extending in a predetermined direction, then the ridges of the transmission element 36 are oriented in direction perpendicular to the predetermined direction and a short, straight line will become visible at the point on the curve 39 where a line extending in the predetermined direction is tangent to the curve 39. The apparent length of the tangent line seen will depend upon the relative brightness of the pattern and upon the degree of curvature at the point of tangency.

In addition to filtering out lines which do not extend perpendicular to the ridges, the transmission element will magnify closely-spaced dots aligned in the direction perpendicular to the ridges into a line. This property makes the transmission element useful as an aid in correlating, interpolating or extrapolating data points.

Both the magnifying and filtering properties of the transmission element make it a valuable tool in analyzing certain visual representations containing hard-to-find linear shapes or dot alignments. For example, the device can be used to find roads and other linear shapes in aerial photographs. To analyze an aerial photograph, the photograph will be observed through the rectangular transmission element of FIG. 1. If it is expected that a road or other linear shape will be found in a predetermined direction, the ridges are aligned perpendicularly to this direction and any line extending in the predetermined direction will be visible through the transmission element. Also, any closely-spaced dots aligned in the predetermined direction will be visible as a line through the transmission element. If the direction of the linear shape or shapes being sought is not known, the rectangular transmission element can be slowly rotated over the aerial photograph until the line or lines appear. Since the rectangular transmission element will only pass lines extending in a direction perpendicular to the ridges, any two lines which appear simultaneously will be parallel and the finding of such parallel lines in an aerial photograph is a valuable aid in analyzing an aerial photograph.

In addition to analyzing aerial photographs, the filtering effect of the transmission element is useful in connection with other visual representations, such as a printed page. For example, in the new data processing equipment which reads printed subject matter and converts it into electrical signals, it is important for the printed subject matter to be properly oriented with respect to the reading apparatus. In other words, the top of the page to be read must be in the right position so that the apparatus does not attempt to read the material in the wrong direction. If the printed page is observed through the rectangular transmission element of FIG. 1, more lines will be transmitted through the transmission element when the transmission element is positioned with its ridges horizontal with respect to the page. A photocell can be used to detect when the transmission element is so oriented and thus ensure that the printed page is properly oriented with respect to the reading apparatus.

Figure 6:
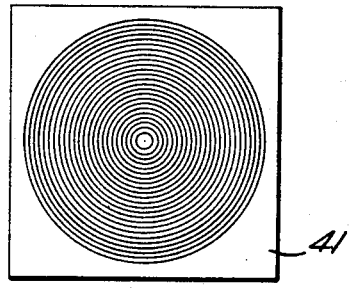
FIG. 6 illustrates the circular optical transmission element of the present invention.

In another embodiment of the invention, the parallel ridges and grooves, instead of being straight lines, are formed as concentric circles, as shown in FIG. 6. As in the case of the rectangular transmission element of FIG. 1, the ridges and grooves are formed on one side of a transparent sheet, which is designated by the reference number 41. The transmission element shown in FIG. 6 is referred to as a circular transmission element.

Figure 7:
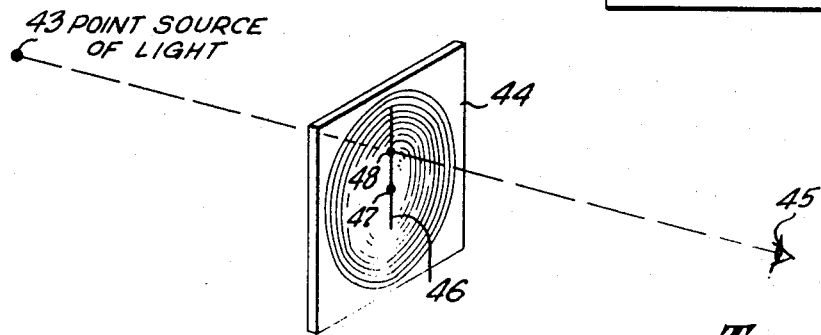
FIG. 7 illustrates how the circular transmission element of FIG. 6 magnifies a point source of light into a line.

If a point source of light 43 is observed through a circular transmission element 44, as is illustrated in FIG. 7, an observer, represented by the eye 45, will see the source 43 magnified into a straight line 46, which will be defined by the center 47 about which the circular ridges are concentric and the point 48 at which a line drawn from the source 43 to the eye 45 intersects the circular transmission element. The line 46 will have its maximum brightness at the point 48 with the brightness of the line diminishing toward the ends thereof.

Figure 8:
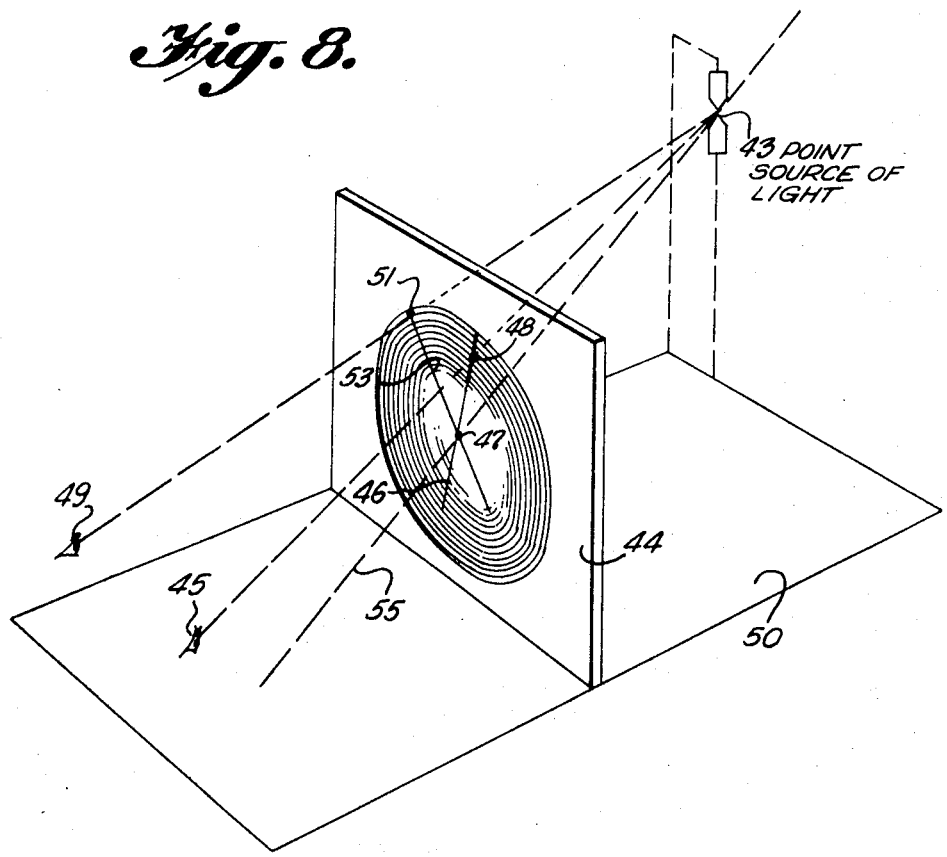
FIG. 8 illustrates a device for producing stereoscopically the optical illusion of a three-dimensional ray of light extending out into space using the circular transmission element of FIG. 6.

The above description with reference to FIG. 7 actually just describes what one eye will see on the circular transmission element. In fact, each eye of the observer will see a line of light in a different angular position on a circular transmission element, as is illustrated in FIG. 8. As described with reference to FIG. 7, the eye 45 will see the line 46 having its direction and position defined by the center 47 and the point 48, at which a line drawn from the source 43 to the eye 45 intersects the circular transmission element. Since a line drawn from the source 43 to the other eye 49 of the observer will intersect the circular transmission element at a point 51 displaced from the point 48, the eye 49 will see a line 53 defined by the points 47 and 51 extending in a different direction from the line 46. Accordingly, since each eye sees a different line, the observer will have an optical illusion of seeing a line 55 extending three-dimensionally out into space. The line 55 will appear to pass through the source 43 and through the center 47 since this is where the projection of the plane defined by the line 46 and the eye 45 intersects the projection of the plane defined by the line 53 and the eye 49.

In order to obtain the stereoscopic effect the size of the transmission element is selected so that the two lines 46 and 53 do not diverge by more than the distance between the eyes of the observer. This feature is important because when the beam diverges to a distance equal to the distance between the eyes of the observer, the beam will appear to be infinite in length as the light rays from the divergent ends coming to the two eyes will be parallel. If the divergent ends were further apart than the distance between the two eyes, the light rays from the divergent ends would no correspond stereoscopically to anything that occurs naturally and accordingly the stereoscopic effect would be destroyed. Instead of limiting the size of the transmission element to prevent the lines 46 and 53 from diverging by a distance greater than the distance between the two eyes, appropriate masking could be used to achieve the same effect.

In the system shown in FIG. 8, the point source of light 43 and transmission element 44 are shown mounted on a common frame or support 50 so that as the support 50 is moved the illusory beam will move with the support and the observer can point the beam in any direction he desires. Alternatively, the source 43 could be an external source such as the sun or a star and the device will generate the optical illusion of a beam pointing or leading to the external source. If the external source is a celestial body the effect would be useful in navigational instruments. The effect obtained with an external source is also useful in guiding mobile craft such as aircraft to a carrier. The external light source could be mounted on the aircraft carrier and the optical illusion of a beam of light extending from the light source to aircraft would be provided for the pilot to assist him in guiding the aircraft to a landing. Obviously, this effect can be used in the guiding of any mobile craft relative to points external to the mobile craft.

Instead of using a point source of light, an extended source could be used such as a line of light as would be provided by a fluorescent tube. An extended source would produce a beam having a shape corresponding to that of the extended source. For example, a line source would produce a beam in the form of a flat ribbon extending out into space.

Instead of using a transmission element made from a transparent sheet such as the rectangular transmission element of FIG. 1 or the circular transmission element of FIG. 6, reflection elements can be used to obtain the same effects. A rectangular reflection element couprises a sheet of reflecting material, the surface of which is formed in tiny, closely-spaced, straight, parallel ridges and grooves and a circular reflection element comprises a sheet of reflecting material the surface of which is formed into tiny, closely-spaced, parallel ridges and grooves, which are in the form of concentric circles. As in the case of the transmission elements, the ridges and grooves of the reflection elements can be formed in the surface of the reflecting material by scratching its surface with sandpaper or with a grinding wheel, or by forming them in a transparent film deposited on the surface. Also, as in the case of the transmission elements, the ridges and grooves should be barely macroscopic or smaller.

Figure 9:
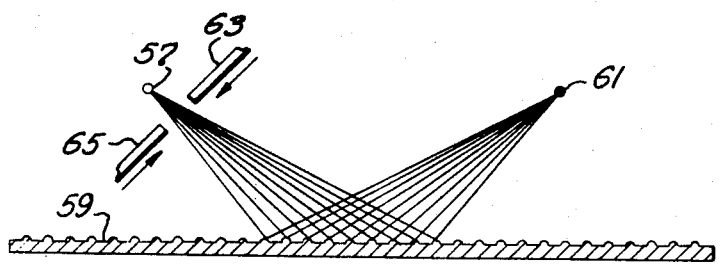
FIG. 9 illustrates a rectangular reflection element and how the rectangular reflection element magnifies a point source of light into a line.

FIG. 9 illustrates how a rectangular reflection element magnifies a point source of light into a reflected line. As shown in FIG. 9, the point source of light is designated by the reference number 57, the rectangular reflection element is designated by the reference number 59, and the eye of the observer is designated by the reference number 61. A sectional view of the reflection element 59 is shown in FIG. 9, and the size of the ridges and grooves has been greatly exaggerated for purposes of illustration. Rays from the source 57 will be reflected off each ridge of the reflecting element to the eye 61. Because the ridges are at most barely macroscopic in size, the individual reflections from each ridge will combine to appear as a single line of light. The length of the reflected line can be varied by means of shutters 63 and 65 which are movable into the path of the light rays from the source 57. As the top shutter 63 is moved down into the light rays, it will reduce the length of the reflected line of light from the right, as shown in FIG. 9, and as the bottom shutter 65 is moved up into the light rays it will reduce the length of the reflected line of light from the left.

The rectangular reflection elements can be used to perform the same filtering and magnifying effects as the rectangular transmission element. To filter all lines in a visual representtaion except those which extend parallel to a given coordinate axis and to magnify into lines closely-spaced dots aligned with a parallel of the given coordinate axis, the rectangular reflection element is positioned to reflect the visual representation with the ridges and grooves extending perpendicularly to the given coordinate axis.

Figure 10:
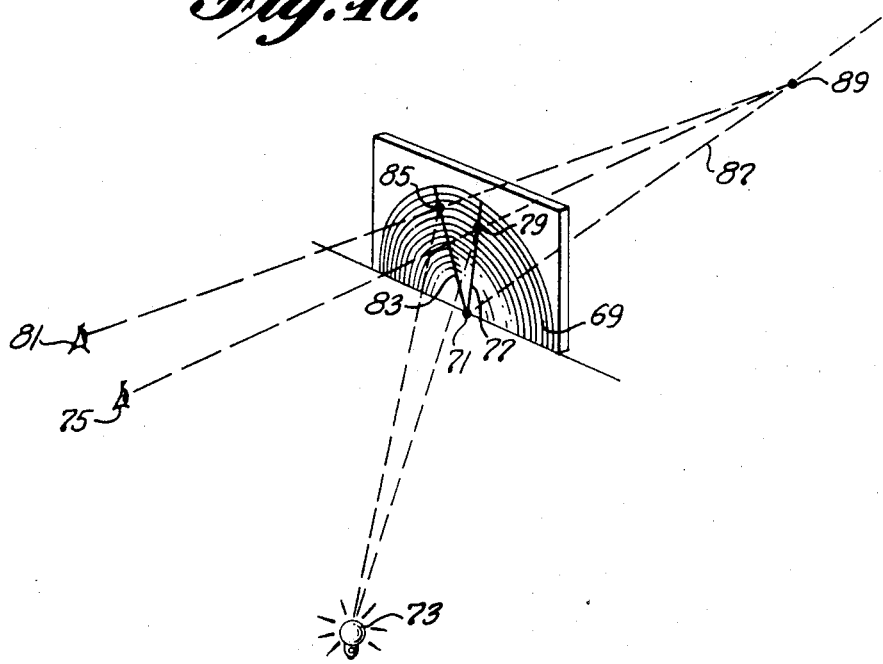
FIG. 10 illustrates a circular reflection element of the present invention and how such a circular reflection element can be used to produce the stereoscopic optical illusion of a light ray extending three-dimensionally into space.

FIG. 10 illustrates how a circular reflection element can be used to produce the optical illusion of a three-dimensional ray extending out into space. In FIG. 10, the reflection element, which is designated by the reference number 69, has semicircular ridges and grooves concentric about a center 71 and is formed by cutting a circular reflection element in half. A light source 73 is positioned to reflect from the ridged surface of the reflection element 69. The eye 75 of an observer will see a reflected line of light 77 defined by the center 71 and the point 79 at which the light source 73 would be seen by the eye 75 if the reflection element 69 were an ordinary flat reflector. The eye 81 of the observer will see a reflected line of light 83 defined by the center 71 and the point 85 at which the source 73 would be seen by the eye 81 if the reflection element 69 were an ordinary flat reflector. Since each eye sees a line of reflected light in a different position, the observer will have the optical illusion of seeing a three-dimensional ray of light 87, which will appear to extend from the center 71 through the point 89, at which the image of the light source 73 would be located if the reflection element 69 were an ordinary flat reflector.

Figure 11:
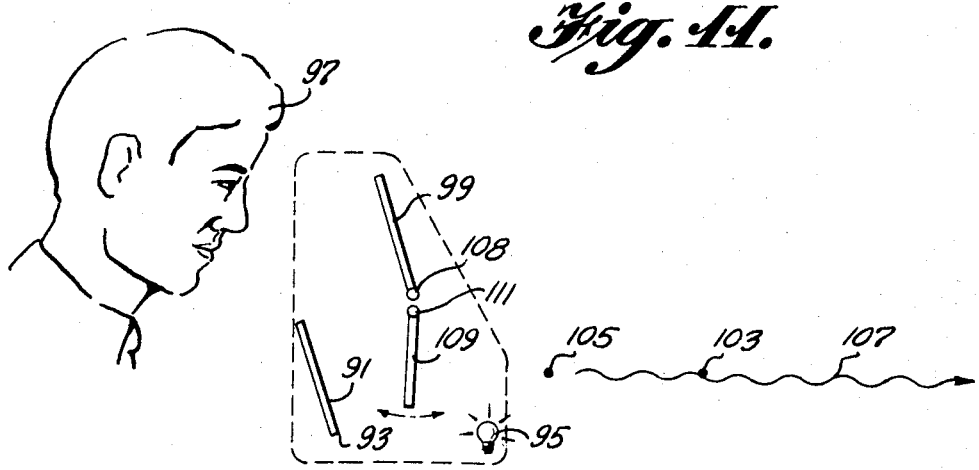
FIG. 11 illustrates a device for producing the optical illusion of a light ray extending three-dimensionally into the environment seen by an observer, making use of the circular reflection element illustrated in FIG. 10.

FIG. 11 schematically illustrates a beam producer which uses a semicircular reflection element like that shown in FIG. 10, and which provides the optical illusion to an observer of a three-dimension beam extending out into space superimposed on the environment of the observer. In FIG. 11, the semicircular reflection element is designated by the reference number 91. The reflection element 91 is positioned so that its center 93, about which the semicircular grooves and ridges are concentric, is at the bottom. A light source 95 is positioned to reflect from the ridged surface of the reflection element 91 with an angle of incidence of about 45°. The reflection of the light source 95 will be seen as a line by the observer 97 after being reflected from a piece of transparent glass 99. The angle of incidence of the reflection coming into the transparent glass 99 is about 45°. Each eye of the observer 97 will see a reflected line of light in a different position, as was explained with reference to FIG. 10, and accordingly the observer 97 will have the optical illusion of seeing a light beam extending out into space. This light beam will appear to extend horizontally away from the beam producer and will be superimposed in the environment seen by the observer 97 through the transparent glass 99. The actual line of the apparent light beam can be determined by determining the position that the image of the light source 95 would occupy in the transparent glass reflector 99 if the reflection element 91 were an ordinary flat optical reflector and the position that the image of the center 93 occupies in the transparent glass reflector 99. The apparent light beam would pass through these two positions. Thus, if the reflection element 91 were an ordinary flat reflector, the image of the source 95 would be at a point 101 in the reflection element 91 and would be at the point 103 in the transparent glass reflector 99. The image of the center 93 in the transparent glass reflector 99 would be at the point 105. Accordingly, the optical illusion of the beam seen by the observer 97 would be along a line 107 defined by the points 103 and 105. The transparent reflector 99 is pivotable about a pivot point 108 to make the direction of the beam adjustable.

Instead of using transparent glass for the reflector 99, a half-silvered mirror or one-way glass could be used, which would increase the brightness of the beam. Also, polaroid or tinted glass could be added over the transparent glass member 99 or in place of the transparent glass member 99 to increase the relative brightness of the beam to the surrounding environment.

A range shutter 109 is provided with pivots about a point 111. As the range shutter 109 pivots it moves into the path of the rays from the source 95 going to the reflection element 91 and thus decreases the length of the optical illusion of the ray extending out into space.

Figure 12:
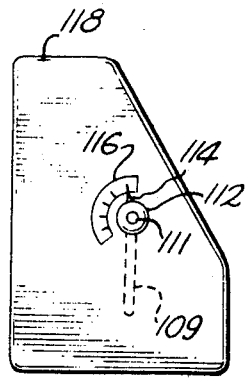
FIG. 12 shows a range finding dial used in the device of FIG. 11.

As shown in FIG. 12, a control knob 112 is provided to adjust the angular position of the range shutter 109 about the pivot point 111. The control knob is provided with a pointer 114 which coacts with a scale 116 on the housing 118 of the device. The scale 116 is calibrated to indicate the distance that the apparent beam 107 extends. With such calibration the observer 19 can use the device to indicate the distance of an object by directing the beam 107 toward the object, adjusting the angular position of the range shutter 109 until the apparent beam 107 ends at the object and then reading the distance indicated by the pointer 114 on the apparent scale 116.

Figure 13:
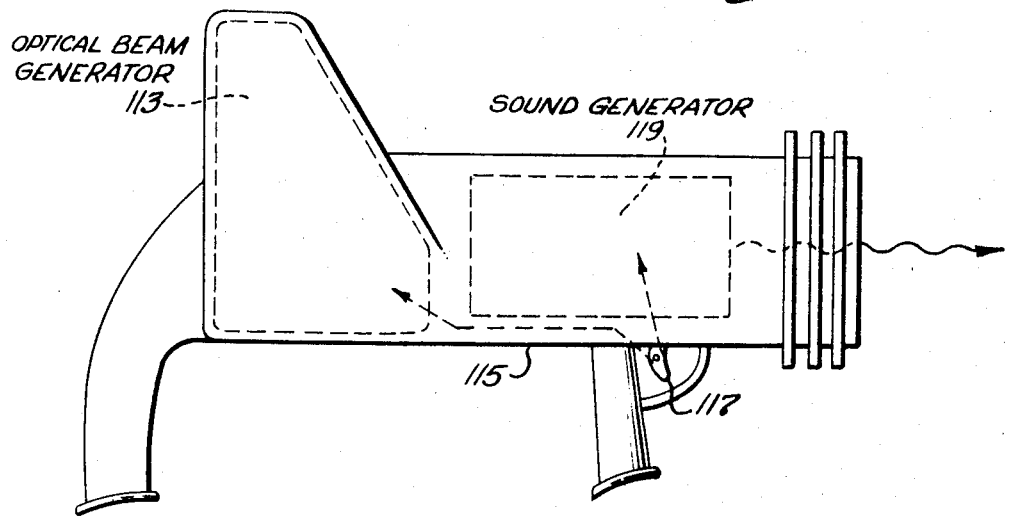
FIG. 13 illustrates a toy ray gun making use of the beam producer illustrated in FIG. 11.

FIG. 13 shows the beam producer of FIG. 11 embodied in a child's toy comprising a ray gun. The beam producer is designated generally by the reference number 113 and is mounted on a housing 115 simulating a barrel, on which is also mounted a trigger 117. The beam producer is positioned relative to the simulated barrel so that the illusion of the beam will appear to come out of the barrel and extend away from the barrel in the direction that the barrel is pointing. In the housing 115 there is mounted a transistor sound generator 119. When the trigger 117 is pulled, it closes circuits to energize the lamp in the optical beam generator 113 and to energize the sound generator 119 so that the sound generator begins to produce an audible sound. A child, upon looking into the viewer of the optical beam generator 113, will have the optical illusion upon pulling the trigger of seeing a beam in three dimensions going out into space from the barrel 115 superimposed in the environment of the child. At the same time, the sound generator 119 will produce a suitable sound. The sound generator, for example, may be a transistor oscillator which is connected to drive an audio speaker. A linkage is provided between the trigger 117 and the shutter 109 so that as the trigger is pulled the shutter 109 is rotated out of the path of the rays from the light source 95. Accordingly, as a result, as the trigger is pulled the length of the ray apparently coming out of the barrel 115 of the toy gun will get longer. Accordingly, when the trigger 117 is first pulled, a beam emerges from the gun and a suitable sound is heard. As the trigger is pulled further, the beam gets longer. When the trigger is released, the beam diminishes and the sound ceases. When the trigger is pulled fully back, the apparent range of the beam is to infinity.

The beam producer in FIG. 11, as well as that shown in FIG. 8, in addition to being useful as a toy, can also be used in several other applications. For example, the beam producer could be used as an aircraft landing aid, especially for aircraft carriers. The device could also be used as a gun director or gunsight. In addition, it could be used in surveying applications and machine tool operations.

The above-described specific embodiments are devices which produce rectilinear beams. By using curved reflection or transmission elements or by curving the ridges in a different manner, the apparently three-dimensional beam can be curved. Also, colored beams can be produced by using colored light sources or colored filters and a plurality of beams can be produced by using more than one light source.

These and many other modifications may be made to the above-described specific embodiments of the invention without departing from the spirit and scope of the invention, which is defined in the appended claims.

What is claimed is:

1. A device for generating the optical illusion of a three-dimensional beam extending into space, comprising a support, a source of light fixed to said support, and optical means mounted on said support positioned to receive said light from said source and to magnify the received light into a line of light, the position of which will vary with the position of the eye of the observer so that each eye of the observer will see a line of light in a different position and the observer will have the illusion of seeing a three-dimensional beam extending into space, said optical means comprising an optical element having a surface formed to define tiny, closely spaced, curved ridges and grooves, said device including means to superimpose the visual representation of lines of light produced by said optical means in the environment seen by the observer so that the observer has the illusion of seeing a three-dimensional beam extending into said environment.

2. A device as recited in claim 1, wherein said optical means comprises a transmission element which transmits rays of light from said source, magnifying said source into a line of light.

3. A device as recited in claim 1 wherein said optical means comprises a reflection element which reflects rays of light from said source, magnifying said source into a reflected line of light.

4. A device as recited in claim 1 wherein the size of said ridges and grooves are no larger than barely macroscopic.

5. A device as recited in claim 1 wherein said ridges and grooves each have a profile to scatter incident rays of light into planes perpendicular to such ridge and groove.

6. A device for producing the optical illusion of a three-dimensional beam extending into space comprising a support, a piece of transparent material mounted on said support having one first surface formed to define a plurality of closely-spaced, tiny curved ridges and grooves extending generally parallel to one another, said ridges and grooves being formed in a manner so that said surface is transparent with said ridges and grooves formed therein, and a light source fixed to said support positioned to irradiate said surface so that said surface magnifies said source into a line of light the position of which varies with the position of the eye of an observer so that each eye of the observer sees a line of light in said surface in a different position and the observer has the optical illusion of seeing a three-dimensional line extending into the environment seen by said observer.

7. A device for producing the illusion of a beam extending three-dimensionally into space comprising a reflection element having a surface formed into tiny, closely-spaced, curved ridges and grooves extending generally parallel to one another, a source of light positioned to irradiate said surface so that light from said source is magnified on said surface into a line of light the direction of which varies with the position of the eye of an observer so that each eye of the observer sees a line of light extending in a different direction, and a combined transmitting and reflecting element positioned to reflect the visual representation produced on said surface approaching said combined transmitting and reflecting element from one side and to transmit the light approaching said combined transmitting and reflecting element from the other side so that the observer has the optical illusion of seeing a beam extending three-dimensionally into the environment seen through said combined transmitting and reflecting element.

8. A device as recited in claim 7 wherein there is provided means to vary the length of the line on said surface seen by the observer and thus vary the length of the apparent beam, and means to indicate the length of the apparent beam.

References Cited

UNITED STATES PATENTS

| 2,363,427 | 11/1944 | Landberg. | |
| 2,463,280 | 3/1949 | Kaehni et al. | 350—162 |
| 3,366,736 | 1/1968 | Snaper | 350—162 X |

FOREIGN PATENTS

| 862,290 | 3/1961 | Great Britain. |

JOHN K. CORBIN, Primary Examiner

U.S. Cl. X.R.

46—226; 350—188; 356—3, 154